United States Patent
Peters et al.

(10) Patent No.: US 9,833,860 B1
(45) Date of Patent: Dec. 5, 2017

(54) SYSTEM AND METHOD FOR PLASMA ARC TRANSFER FOR PLASMA CUTTING

(71) Applicant: Lincoln Global, Inc., City of Industry, CA (US)

(72) Inventors: Steven R. Peters, Huntsburg, OH (US); William T. Matthews, Chesterland, OH (US); Laurent Majerus, Cleveland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 15/217,664

(22) Filed: Jul. 22, 2016

(51) Int. Cl.
*B23K 10/00* (2006.01)

(52) U.S. Cl.
CPC .................... *B23K 10/006* (2013.01)

(58) Field of Classification Search
CPC ... H05H 1/34; H05H 1/36; H05H 1/26; B23K 10/006
USPC ............ 219/121.44, 121.39, 121.45, 121.46, 219/121.54, 121.57
See application file for complete search history.

(56) References Cited

U.S. PATENT DOCUMENTS

| | | | |
|---|---|---|---|
| 3,242,305 A | 3/1966 | Kane | |
| 3,558,973 A | 1/1971 | Pochert | |
| 3,637,974 A | 1/1972 | Tajbl | |
| 3,662,147 A | 5/1972 | Ogden | |
| 4,225,769 A | 9/1980 | Wilkins | |
| 4,280,042 A | 7/1981 | Berger | |
| 4,370,539 A | 1/1983 | Garlanov | |
| 4,767,908 A | 8/1988 | Dallavalle | |
| 4,791,268 A | 12/1988 | Sanders | |
| 4,814,577 A | 3/1989 | Dallavalle | |
| 4,896,016 A | 1/1990 | Broberg | |
| 4,987,285 A | 1/1991 | Dallavalle | |
| 4,996,407 A | 2/1991 | Traxler | |
| 5,036,176 A | 7/1991 | Yamaguchi | |
| 5,039,837 A | 8/1991 | Nourbakhsh | |
| 5,070,227 A | 12/1991 | Luo | |
| 5,166,494 A | 11/1992 | Luo | |
| 5,170,030 A | 12/1992 | Solley | |
| 5,170,033 A | 12/1992 | Couch, Jr. | |
| 5,225,658 A | 7/1993 | Yamaguchi | |
| 5,235,162 A | 8/1993 | Nourbakhsh | |
| 5,296,665 A | 3/1994 | Peterson | |
| 5,310,988 A | 5/1994 | Couch, Jr. | |
| 5,317,126 A | 5/1994 | Couch, Jr. | |
| 5,416,297 A | 5/1995 | Luo et al. | |
| 5,530,220 A | 6/1996 | Tatham | |
| 5,597,497 A | 1/1997 | Dean | |
| 5,620,617 A | 4/1997 | Borowy | |
| 5,660,745 A | 8/1997 | Naor | |
| 5,681,489 A | 10/1997 | Carkhuff | |
| 5,796,067 A | 8/1998 | Enyedy | |

(Continued)

OTHER PUBLICATIONS

Hackl, Henrich, Digitally Controlled GMA Power Sources, pp. 1-7; http://www.fronius.com/worldwide/usa/products/paper_digitally_controlled_power_sources_gb.pdf.

*Primary Examiner* — Mark Paschall
(74) *Attorney, Agent, or Firm* — Perkins Coie LLP (57) ABSTRACT

A plasma arc cutting system and method is providing which provides a fixed arc start current until separation occurs between the torch nozzle and electrode. After separation the current is dropped to a low current level for a period of time and then current pulses are provided until a work current is detected in a work piece to be cut.

19 Claims, 6 Drawing Sheets

(56) References Cited

U.S. PATENT DOCUMENTS

| | | |
|---|---|---|
| 5,828,030 A | 10/1998 | Naor |
| 5,866,869 A | 2/1999 | Schneider et al. |
| 5,886,315 A | 3/1999 | Lu |
| 5,900,169 A | 5/1999 | Borowy |
| 5,938,949 A | 8/1999 | Enyedy |
| 5,961,855 A | 10/1999 | Hewett |
| 5,990,443 A * | 11/1999 | Tatham .................. H05H 1/36 219/121.54 |
| 5,994,663 A | 11/1999 | Lu |
| 6,054,670 A | 4/2000 | Naor |
| 6,133,543 A | 10/2000 | Borowy |
| 6,242,710 B1 | 6/2001 | Naor |
| 6,274,841 B1 | 8/2001 | Ramakrishnan |
| 6,326,581 B1 | 12/2001 | Laimer |
| 6,346,685 B2 | 2/2002 | Severance, Jr. |
| 6,350,960 B1 | 2/2002 | Norris |
| RE37,608 E | 3/2002 | Solley |
| 6,486,430 B2 | 11/2002 | Naor |
| 6,498,317 B2 | 12/2002 | Hardwick |
| 6,570,132 B1 | 5/2003 | Brunner |
| 6,614,001 B2 | 9/2003 | Hackett |
| 6,700,091 B2 | 3/2004 | Jones |
| 6,703,581 B2 | 3/2004 | Jones |
| 6,815,632 B2 | 11/2004 | Dallavalle |
| 6,881,921 B2 | 4/2005 | Horner-Richardson |
| 6,903,301 B2 | 6/2005 | Jones et al. |
| 7,022,935 B1 | 4/2006 | Matus et al. |
| 7,615,720 B2 | 11/2009 | Sanders |
| 9,000,322 B2 * | 4/2015 | Barnett .................. H05H 1/34 219/121.51 |
| 2001/0037996 A1 | 11/2001 | Naor |
| 2002/0117483 A1 | 8/2002 | Jones |
| 2002/0117484 A1 | 8/2002 | Jones |
| 2004/0149702 A1 | 8/2004 | Dallavalle |
| 2004/0232118 A1 | 11/2004 | Horner-Richardson et al. |
| 2008/0083713 A1 * | 4/2008 | Sanders ................ B23K 9/013 219/121.57 |
| 2008/0237201 A1 * | 10/2008 | Shipulski ............... B23K 10/02 219/121.48 |

\* cited by examiner

SYSTEM AND METHOD FOR PLASMA ARC TRANSFER FOR PLASMA CUTTING

TECHNICAL FIELD

Devices, systems, and methods consistent with the invention relate to plasma cutting, and more specifically to devices, systems and methods related to plasma arc cutting torches and components thereof.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high temperatures associated with the ionized plasma jet many of the components of the torch are susceptible to failure. This susceptibility to failure is increased during arc transfer at the beginning of a plasma cutting operation. The damage is caused by the plasma arc making contact with components within the torch at high current levels. The damage can cause premature failure of the components and this failure can significantly interfere with the operation of the torch and prevent proper arc ignition at the start of a cutting operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is plasma torch system and a method of starting the plasma torch designed to optimize performance and durability of the torch. Specifically, exemplary embodiments of the present invention have an improved starting method to minimize damage during arc transfer.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to plasma arc torches useful various cutting, welding and spraying operations. Specifically, embodiments of the present invention are directed to air cooled plasma arc torches, while others are directed to liquid cooled embodiments. Of course, some of the features described herein can be used in either torch configurations without detracting from the novelty of the exemplary embodiments. Further exemplary embodiments are directed to air cooled plasma arc torches which are retract arc torches. As generally understood, retract arc torches are torches where the electrode is in contact with the nozzle for arc initiation and then the electrode is retracted from the nozzle so that the arc is then directed through a throat of the nozzle. In other types of retract torches, the electrode stays stationary and the nozzle is moved. Exemplary embodiments of the present invention can apply to both types. The construction and operation of these torches, as well as liquid cooled torches, are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are primarily directed to a hand held plasma torch for cutting. However, embodiments of the present invention are not limited in this regard and embodiments of the present invention can be used in welding and spraying torches without departing from the spirit or scope of the present invention. Various types and sizes of torches are possible at varying power levels if desired. For example, exemplary embodiments of the present invention can be used on cutting operation that utilize a cutting current in the range of 40 to 100 amps, and can cut workpieces having a thickness of up to 0.075 inches, and in other embodiments can cut workpieces of a thickness of up to 1.5 inches. Further, the torches and components described herein could be used for marking, cutting or metal removal. Additionally, exemplary embodiments of the present invention, can be used with varying currents and varying power levels. The construction and utilization of air coolant systems of the type that can be used with embodiments of the present invention are known and need not be discussed in detail herein.

Figure 1:
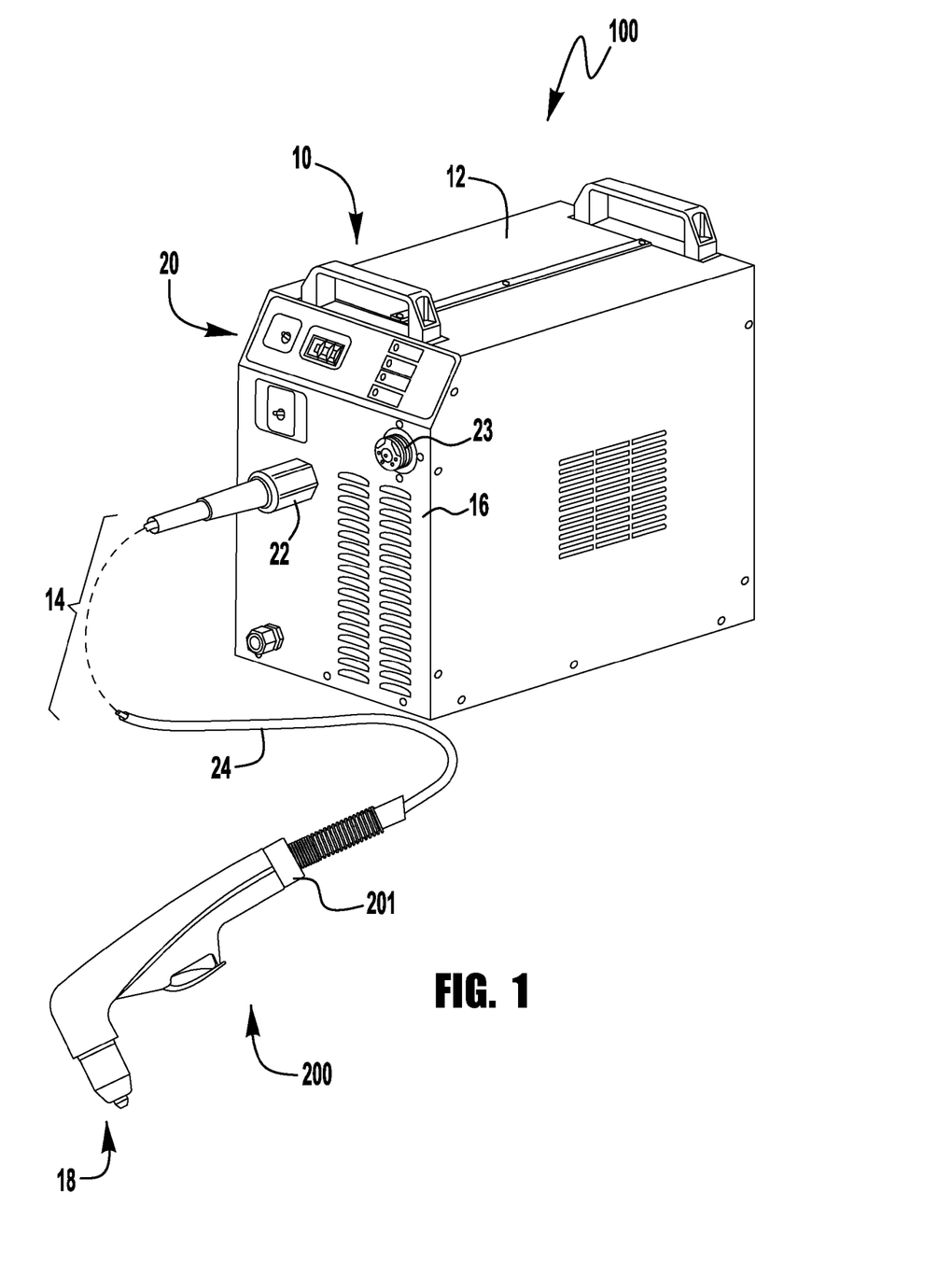
FIG. 1 is a diagrammatical representation of an exemplary cutting system which can be used with embodiments of the present invention.

Turning now to FIG. 1, an exemplary cutting system 100 is shown. The system 100 contains a power supply 10 which includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements. Further, the power supply 10 can be constructed similar to known plasma cutting power supplies capable of operating as described herein. The power supply 10 can have a computer controller can be any known computer device and the power electronics can be any type of power electronics, such as inverter-based or transformer-based. Controllers of this type, and their use and functionality are generally known by those of skilled in the art, as are their incorporation into plasma cutting power supplies. The controller in the power supply would be used to control the current and/or voltage output, and the overall operation, as described herein. The controller would be coupled to internal power generation and output circuits, of the type generally known for plasma cutting power supplies, to the control the output current to start the plasma cutting operation as described herein, as well as the desired output cutting current. Because the power supply and power generation components, as well as their control, are known to those of skill in the art, their detailed construction and operation are not described herein in detail.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include the torch electrode, nozzle, shield and swirl ring.

Figure 2A:
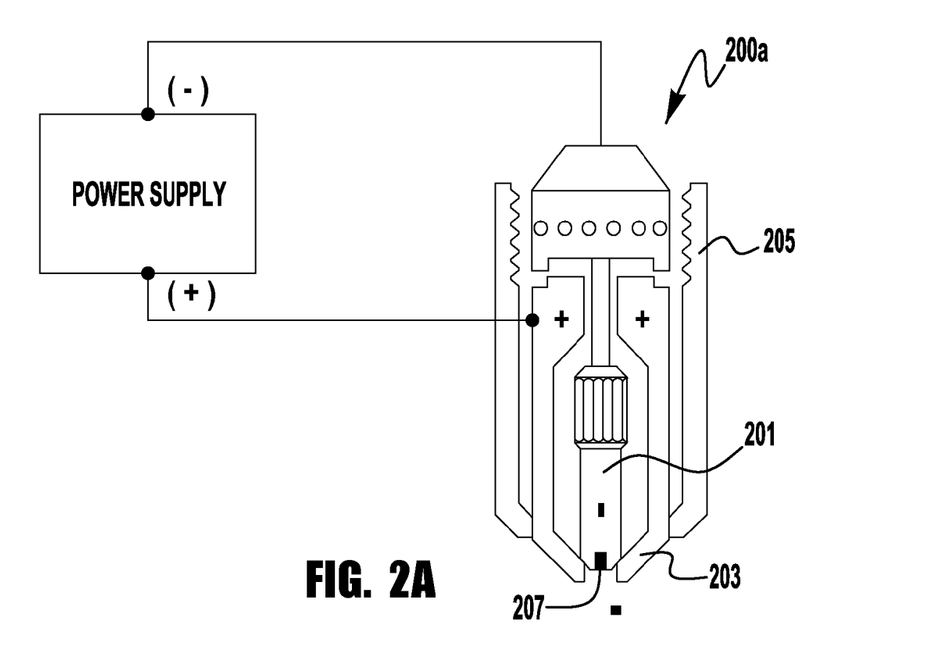
FIGS. 2A through 2D are diagrammatical representations of a portion of the head of an exemplary embodiment of an air cooled torch of the present invention in different positions.
Figure 2B:
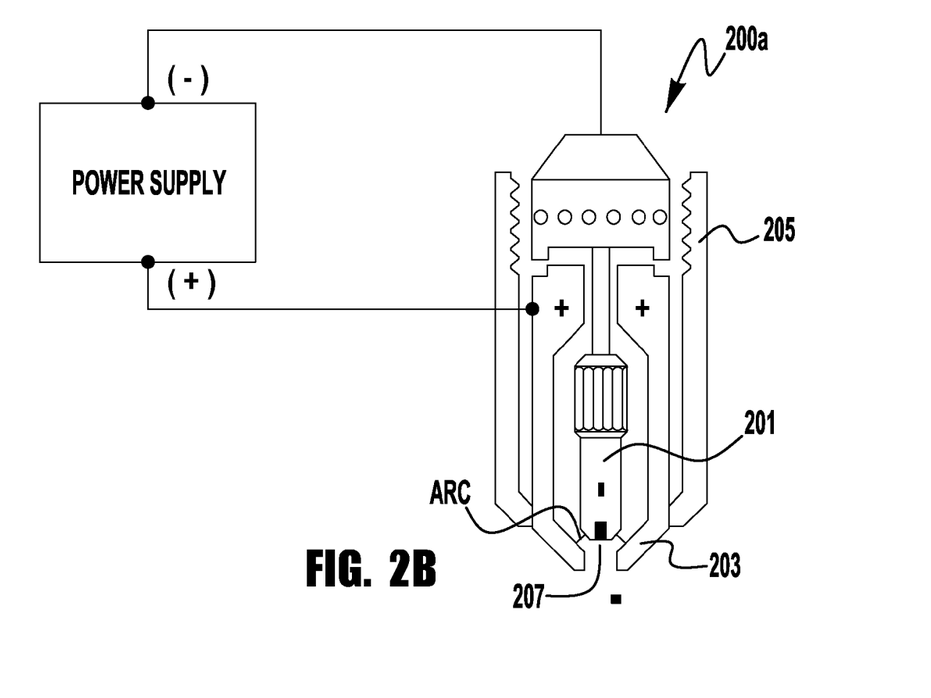
Figure 2C:
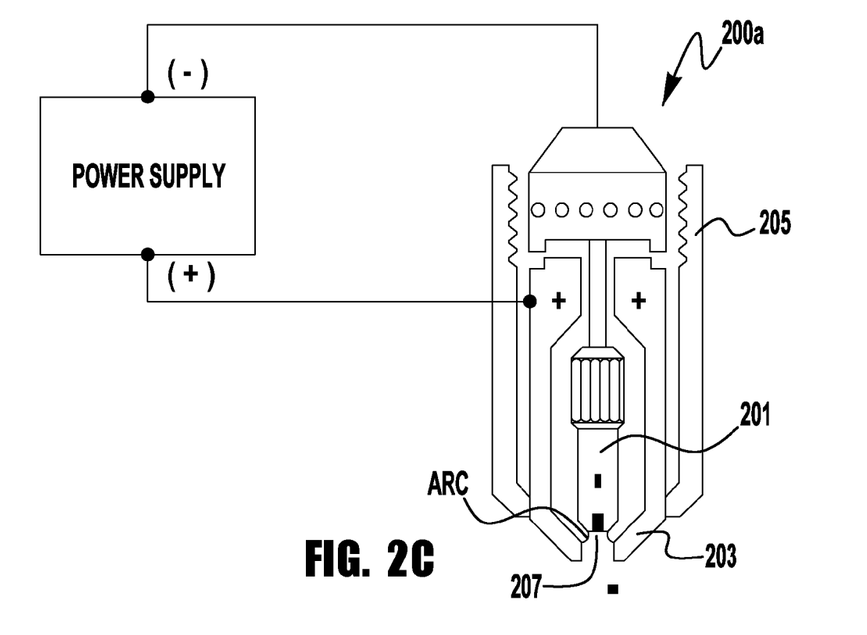
Figure 2D:
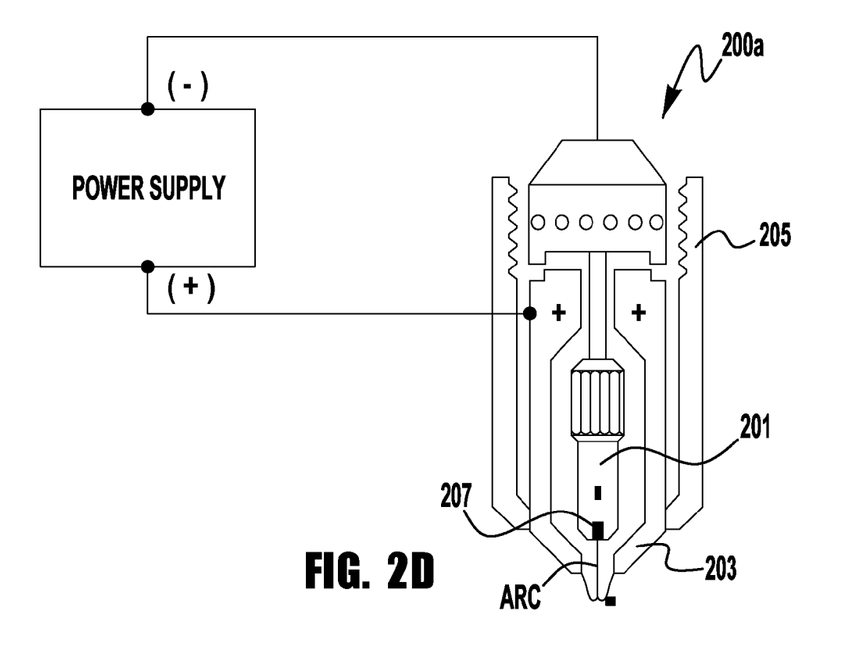

FIGS. 2A through 2D depict the cross-section of an exemplary torch head 200a of a known construction. It should be noted that many of the components of the torch head 200a are not shown for clarity. As shown, the torch 200a contains at least an electrode 201, a nozzle 203, a retainer 205 and an insert 207 within the distal end of the electrode 201. The insert 207 can be made of hafnium or other similar materials. At the beginning of a cutting operation the electrode 201 is in contact with an inner surface of the nozzle 203 as shown in FIG. 2A. The electrode 201 and nozzle 203 are constructed so that the insert is centered with an exit orifice in the nozzle 203. Ultimately the generated arc extends from the insert 207 through the orifice and out of the torch 200a. As the cutting operation starts, an electrical current is provided which passes from the electrode 201 to the nozzle 203 via the contact surfaces. Also, a shielding gas is provided that passes between the electrode 201 and nozzle 203. As shown in FIG. 2B when this gas flow reaches a certain pressure level it causes separation between the electrode 201 and the nozzle 203. As these components separate an arc is generated between the components as shown. The separation between the electrode 201 and the nozzle 203 continues to grow and the arc is pushed—by the shielding gas flow—toward the orifice of the nozzle 203. This is generally shown in FIG. 2C. After the arc reaches the orifice (FIG. 2C) the arc then exits the nozzle 203 and the upstream portion of the arc moves to the insert 207 so that the arc projects from the insert to outside of the orifice. This is generally shown in FIG. 2D and is referred to as the pilot arc—before it makes contact with a workpiece.

Figure 3:
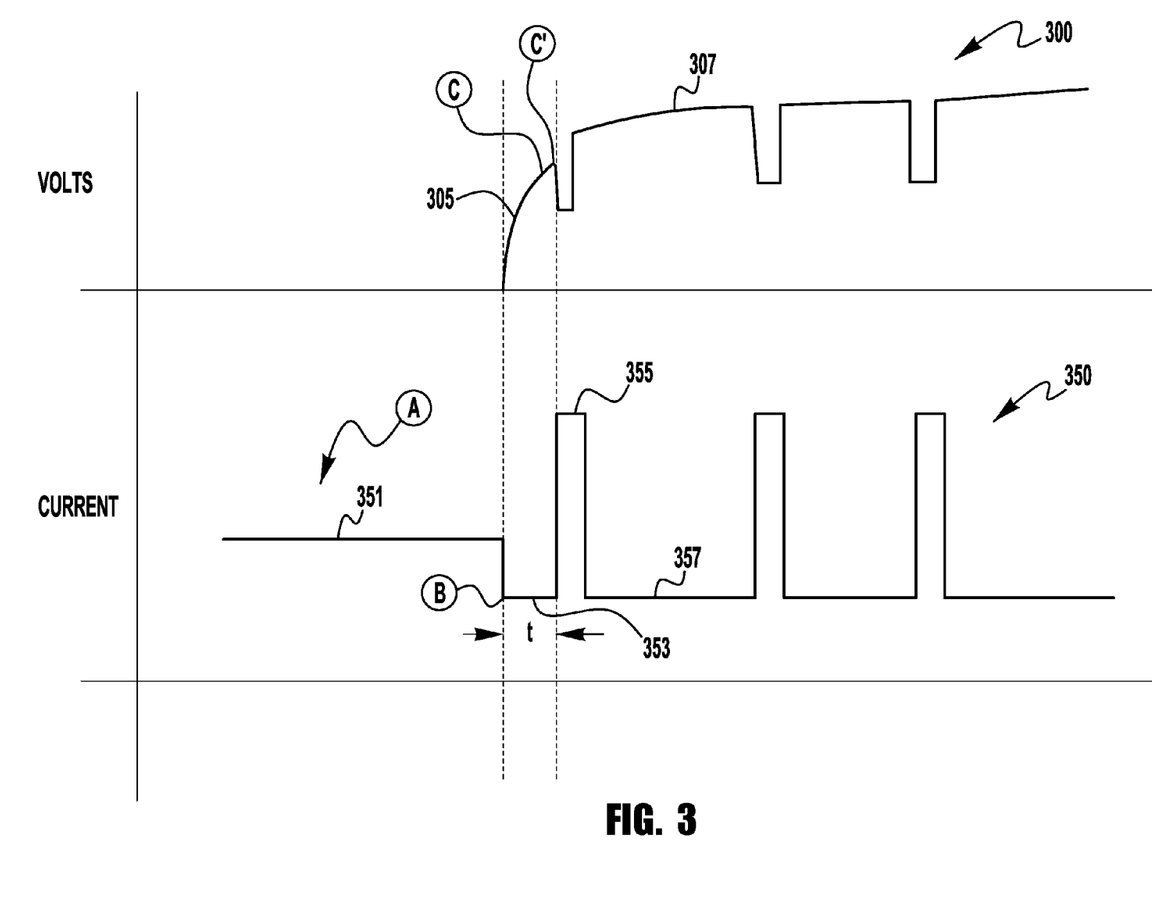
FIG. 3 is a diagrammatical representation of a voltage and current waveform of an arc transfer operation in accordance with an embodiment of the present invention.

Turning now to FIG. 3, exemplary current and voltage waveforms are shown during an arc start and arc transfer portion of a plasma cutting operation. It should be noted, that the embodiment shown in FIG. 3 is intended to be exemplary and other exemplary embodiments are not limited thereto. Each of the voltage 300 and current 350 waveforms correspond to each other. As explained above, during a plasma arc start process the torch electrode is in contact with the nozzle which allows current to pass between the two components. During this initial stage of the starting process A the current is held at a first level 351. In exemplary embodiments, this current level is in the range of 20 to 30 amps. In other embodiments, the current is in the range of 23 to 28 amps, and for example can be 25 amps. In exemplary embodiments, the voltage during this initial phase is less than 20 volts. This current level 351 is maintained for a period of time, while the electrode is shorted and while the gas (shielding and/or cutting gas) pressure is increased. When the gas pressure reaches a certain level the electrode is pulled away from the nozzle. In exemplary embodiments, it can take between 100 to 500 ms for the electrode to lift away from the nozzle—from when the gas flow starts. Of course, in other embodiments a different time can be achieved depending on factors such as air pressure, torch length, etc. When the power supply detects the separation of the nozzle (B) and the electrode (e.g., via a detected voltage increase) the current level is reduced to a second level 353 and maintained for a duration t. The second current level 353 is lower than the first level 351 and in some exemplary embodiments can be in the range of 10 to 20 amps. In other exemplary embodiments, the level 353 can be in the range of 13 to 17 amps, and can be for example 15 amps. In other exemplary embodiments, the second current level is in the range of 30 to 55% below the first level. In other exemplary embodiments, the second level is in the range of 35 to 45% below the first level. During this initial separation of the electrode and the nozzle the pilot arc is created between the nozzle and the electrode, and the selected current should be at a level to allow an initial arc to be created when separation occurs. This low current level is maintained during the time the arc travels along the shoulder of the electrode and until it reaches the hafnium insert 207. This low level of current helps in preventing the pilot arc from damaging any of the torch components (e.g., electrode shoulder) when the arc is created and moved along the electrode. The period of time t for this low current level 353 can be a predetermined duration—which in some embodiments is in the range of 5 to 40 ms. In other exemplary embodiments, it can be in the range of 10 to 25 ms, and can be for example 20 ms. However, in other exemplary embodiments the duration t can be based on reaching a voltage threshold level. For example, as shown in FIG. 3, when the voltage reaches point C the second current level is stopped and a first current pulse 355 is initiated. The voltage threshold C can be a predetermined threshold level and can be, for example, in the range of 65 to 85% of the peak voltage level of the voltage pulses 307. In other embodiments, the predetermined voltage level can be in the range of 70 to 80% of the peak level of the voltage pulses 307. In other exemplary embodiments, the voltage threshold level can be in the range of 80 to 120 volts.

As shown in FIGS. 2B through 2D as the electrode lifts away from the nozzle the arc is pushed along the nozzle until it reaches the orifice of the nozzle. As shown in these figures the arc migrates along the nozzle until it reaches the exit orifice of the nozzle, at which time the arc is pushed out through the orifice (FIG. 2D). Similarly, the arc moves along the shoulder of the electrode until it is moved to the hafnium insert 207. When the arc is pushed out of the orifice it becomes the pilot, or non-transferred arc.

After the pilot arc is formed, where the arc is pushed through the orifice and the arc originates from the hafnium insert 207, a series of current pulses 355 are initiated. The pulses have a relatively high current level and a relatively low frequency. This allows the pilot arc to stabilize and provide proper arc transfer to the work piece, without imparting appreciable damage to the torch components, thus increasing the usable life of the torch components, such as the electrode and the nozzle. In exemplary embodiments, the pulses have a peak current in the range of 30 to 55 amps, and in some embodiments, can be in the range of 35 to 45 amps. In other exemplary embodiments, the pulses 355 have a current which is in the range of 35 to 75% higher than that or the current for the first current level 351. In other exemplary embodiments, the peak current for the pulses 355 is in the range of 50 to 65% higher than that of the current level for the first current level 351. In exemplary embodiments, the background current level 357 between the pulses is in the range of 8 to 20 amps, and in other exemplary embodiments can be in the range of 11 to 18 amps. Further, in exemplary embodiments of the present invention the pulsing portion of the current waveform has an average current which is less than 30 amps.

The pulsing of the current allows the length of the pilot arc to increase—which can make it easier for the pilot arc to connect with the workpiece, but the high level of current is not maintained (if no connection is made) so as to limit damage to the components. Further, in exemplary embodiments the transition between the background current levels 357 and the peak levels 355 is relatively slow. This slower ramp rate aids providing stable arc transition between low and high current levels. In exemplary embodiments of the present invention the current ramp rate can be in the range of 1 to 10 a/ms. In other exemplary embodiments, the ramp rate is in the range of 3 to 7 a/ms. With the above described embodiments, a very low heat input into the torch components prior to the arc making contact with a work piece is achieved.

In exemplary embodiments of the present invention, the frequency for the current pulses is in the range of 0.25 to 30 Hz. In additional exemplary embodiments, the current is provided at a frequency in the range of 8 to 25 Hz, and yet in further exemplary embodiments, the frequency is in the range of 12 to 20 Hz. However, in other exemplary embodiments, the frequency is in the range of 0.25 to 8 Hz, while in other exemplary embodiments the frequency is in the range of 1 to 5 Hz.

As shown in FIG. 3, the first current pulse after electrode-nozzle separation occurs before the voltage reaches the peak voltage level for the voltage pulses 307. In exemplary embodiments, the peak voltage C' of the initial voltage pulse 305 is in the range of 65 to 90% of the peak voltage level of the pulses 307. In other exemplary embodiments, the peak voltage C' can be in the range of 70 to 80% of the peak voltage level of the pulses 307. In exemplary embodiments, the peak voltage of the pulses 307 is in the range of 140 to 190 volts, while in other exemplary embodiments the peak voltage of the pulses 307 is in the range of 150 to 180 volts.

In exemplary embodiments, the current pulses 355 can have a relatively short peak duration. For example, in some exemplary embodiments, the peak current duration is in the range of 4 to 20 ms. In other exemplary embodiments, the peak duration is in the range of 6 to 14 ms. Between each of the pulses 355 is a background current level 357. In some exemplary embodiments of the present invention, the background current level 357 is the same as the second current level 353. However, in other embodiments this may not be the case as the background current 357 can be either higher or lower than the second current level 353. In some exemplary embodiments, the background current level 357 is in the range of 8 to 20 amps, and in further exemplary embodiments, the background current level is in the range of 11 to 18 amps. In yet further exemplary embodiments, the peak pulse current (355) to background current (357) ratio is in the range of 2:1 to 3.5:1. In other exemplary embodiments, the peak pulse current (355) to background current (357) ratio is in the range of 2.3:1 to 3:1.

The above described exemplary embodiments greatly reduce the "wear and tear" on the torch components both during the transition from the arc origination to the nozzle orifice and during the pilot arc prior to arc contact with the work piece. The pulsing of the current allows for intermittent longer reach of the arc, while still providing an overall lower heat input prior to arc contact. This greatly improves the operational life of the torch components, such as the electrode and the nozzle.

In the embodiments described above, with each current pulse 355 the pilot arc grows. During at least some of the pulsing period described above both the workpiece to be cut and the nozzle are in common with each other. However, as the pulses increase the size of the pilot arc, during pulsing the current level through the workpiece increases. When the current detected through the workpiece reaches a threshold level (which can be predetermined for a given cutting operation) then a switch removes the nozzle from the current path such that only the workpiece and the electrode are in the current path. When the current path is switched to only through the workpiece (and not the nozzle) then pulsing—as shown in FIG. 3—is turned off in favor of the cutting current level. The transition from the pulsing current level to the cutting current level can be relatively slow. For example, in exemplary embodiments the rate of charge starts at around 1 a/ms and exponentially reduces from there until the cutting current level is reached.

Figure 4:
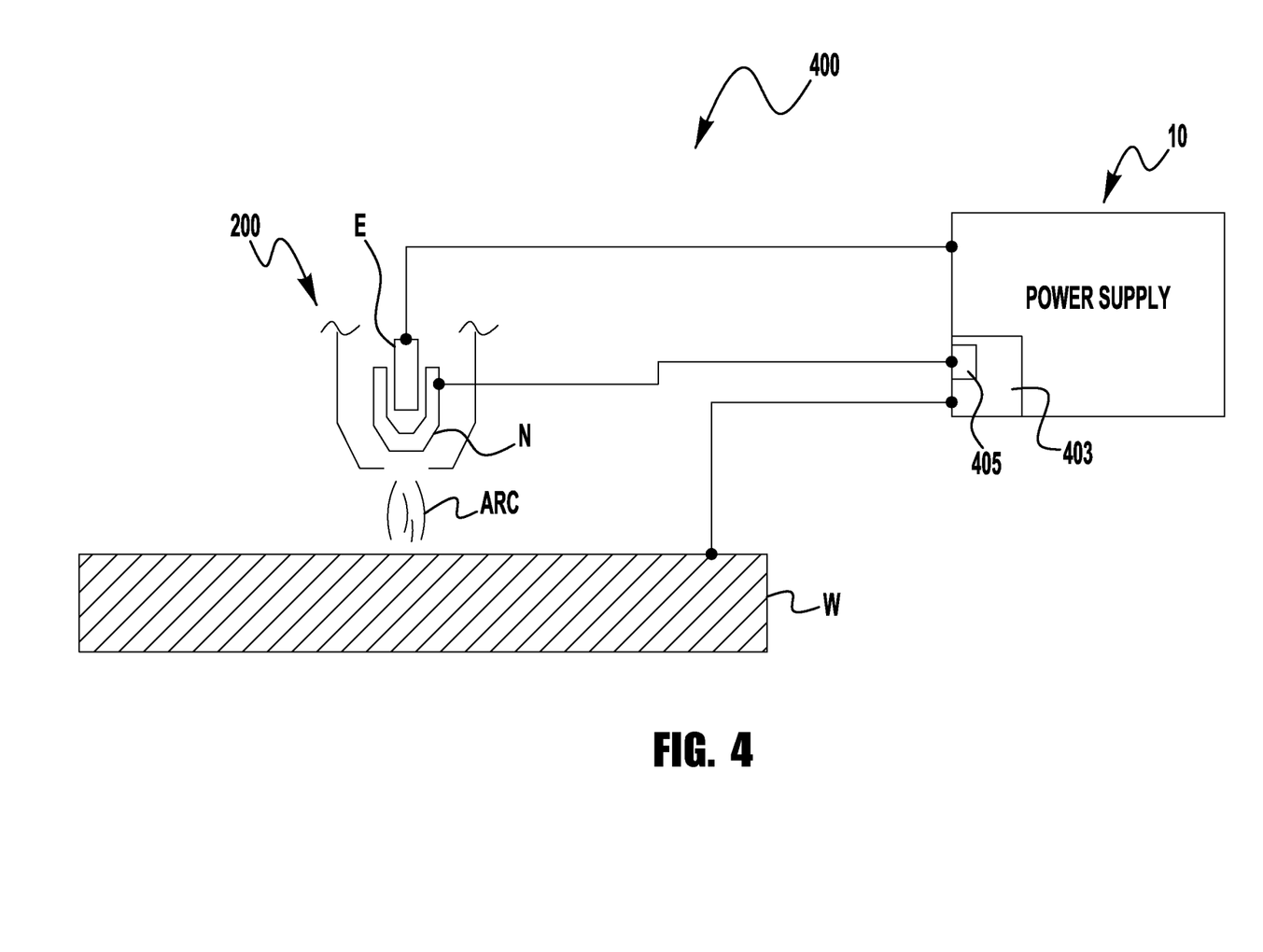
FIG. 4 is a diagrammatical representation of an exemplary current path of embodiments of the present invention.

The system described above is generally shown in FIG. 4. To be clear, FIG. 4 is a simplistic representation of a cutting system 400, where many components are missing, such as gas flow, etc., for purposes of clarity. As shown, the system comprises a power supply 10, as briefly described above, which supplies the cutting power and has control electronics internal to the power supply 10 which controls its operation. As described above, during arc start a current path exists from the power supply to the electrode E, nozzle N and workpiece W, where the nozzle N and workpiece W are common. The power supply 10 has a switching circuit 403 which has at least one switch 405 coupled to the lead which connects the power supply 10 to the nozzle N. As explained above, when the current detected on the workpiece lead reaches a threshold level the switching circuit 403 causes the switch 405 to open to take the nozzle N out of the current path. After the switch 405 opens the current path is through the electrode E and workpiece W and power supply 10, and not the nozzle N. This ensures the transfer of the arc from the nozzle N to the workpiece W.

Figure 5:
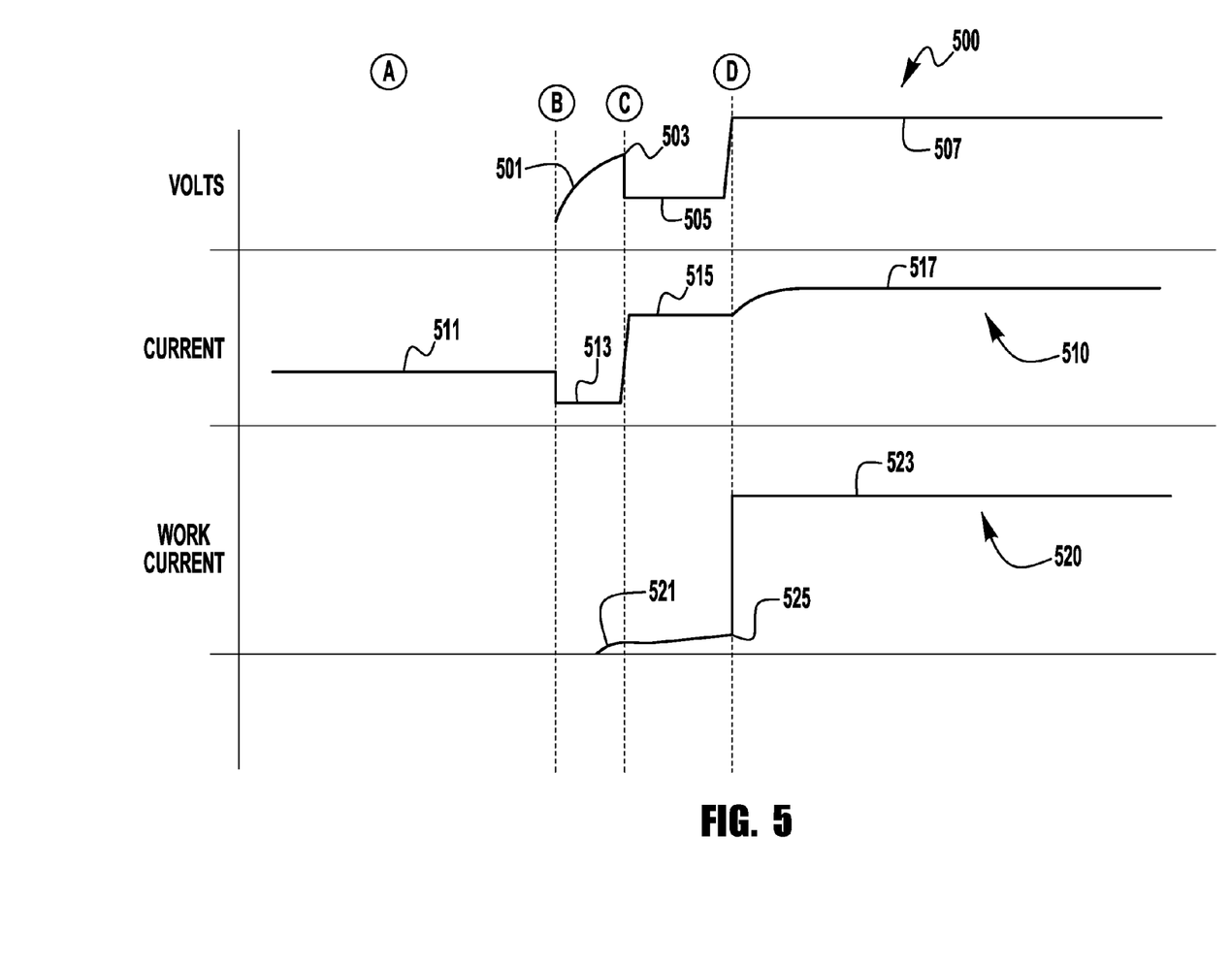
FIG. 5 is a diagrammatical representation of exemplary voltage, work current and current waveforms of another embodiment of an arc transfer operation.

FIG. 5 depicts another aspect of embodiments of the present invention. In such embodiments, the arc is able to be moved to the workpiece much quicker, for example after the first pulse of the starting process described above. FIG. 5 shows exemplary current 510, voltage 500 and work current 520 waveforms of an exemplary embodiment. As shown, in region A the nozzle and electrode are in contact with each other and the supplied current is at the first level 511, which is similar to the first current level described above. At point B the electrode lifts away from the nozzle, at which time the current is dropped to a second current level 513 (as described above), and as shown the voltage increases 501 to point C. At point C, the voltage drops because the pilot arc has transferred from the body/face of the electrode (which can be copper and/or silver) to the hafnium insert of the electrode. (Other materials besides hafnium can also be used in the electrode). The voltage drops from the peak 503 to a voltage level 505 during the first current pulse 515 that is triggered when the voltage drop is detected. It is noted that as the arc reaches the hafnium insert it is also being pushed out of the nozzle orifice (see FIG. 2D). Because the current path extends out of the orifice and back the voltage level increases. When this voltage level increases (which can be detected via a dv/dt type circuit) the pulse(s) can begin. In other embodiments, a predetermined time limit is utilized to determine when the arc is transferred to the orifice. For example, in some exemplary embodiments, the predetermined time limit between arc detection and transfer is in the range of 5 to 40 ms. In other exemplary embodiments, the time limit/delay is in the range of 10 to 25 ms. As shown, the work current begins (521) during the pilot arc phase of the process as at least some current starts to flow through the workpiece. Unlike the waveform shown in FIG. 3, in the shown embodiment, the current pulse 515 has a longer peak current duration until point D at which complete arc transfer occurs and the current is ramped up to the cutting current level 517, having a voltage level 507. The cutting voltage level 507 is higher than the voltage level 503, and the cutting current level 517 is higher than the pulse 515 peak current level. When it is determined that the arc is sufficiently passed to the workpiece to be cut (at point D) the current path to the nozzle is open so that the nozzle is removed from the current path. This is evidenced by the increase in the work current waveform 520 to the work current level 520. In exemplary embodiments of the present invention, a work current threshold level 525 is used to determine when the arc is sufficiently transferred to the workpiece. The threshold value 525 can be a predetermined threshold for the power supply. In other exemplary embodiments, the threshold value 525 can be determined by the power supply based on cutting parameters/inputs. For example, in some embodiments, the threshold value 525 is based on the desired current level 517 for the cutting operation. That is, the higher the cutting current level 517 the higher the threshold value 525. In exemplary embodiments, the work current level can be at least 5 amps. Thus, when the work current reaches or exceeds 5 amps, the switching occurs. Of course, in other embodiments, other aspects of the cutting operation can be used to aid in determining the threshold value 525. As explained previously, when the threshold is reached the switching circuit removes the nozzle from the current path.

In the embodiment shown in FIG. 5, a single current pulse 515 having a longer peak duration is shown. However, in other embodiments a plurality of current pulse (like that shown in FIG. 3) can be used before the determination that the arc has sufficiently transferred. In exemplary embodiments, the single pulse has a peak current level in the range of 25 to 40 amps, and in other embodiments can be in the range of 30 to 35 amps. Further, in exemplary embodiments, the duration of the peak current level of the pulse 515 can be predetermined, or can be controlled as described above. In some exemplary embodiments, the pulse 515 can have a peak duration in the range of 3.5 to 6 seconds. In other embodiments, the duration can be in the range of 4.5 to 5.5 seconds, and can be, for example, 5 seconds. Of course, if no work current is detected (as described above) then then other pulses can follow the pulse 515 of the type described with respect to FIG. 3, or the following pulses can be similar to the pulse 515 described above, until a work current is detected.

As described previously, embodiments of the present invention allow for improved arc transfer to the workpiece, in both stability and duration, while minimizing damage to the electrode and nozzle, and thus improving the operational duration of these components. This greatly improves the operational efficiency of cutting systems and cutting operations.

Further, the subject matter above includes various discussions of voltage and/or current detection and control. As described previously, this aspect of detection and control can be controlled via the control electronics and circuitry within the power supply. Switching circuits, current and voltage feedback and detection circuits, control electronics and power supply electronics suitable to control current and voltage as described herein are known by those of skill in the art and need not be described in detail herein. Of course, any known control electronics, switching circuitry, etc. that is capable of controlling current and voltage as described herein can be used without departing from the spirit or scope of the present invention.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

We claim:

1. A method of starting a plasma arc cutting operation, said method comprising:
   providing a plasma cutting torch having an electrode and a nozzle which are in contact with each other;
   providing a first current to said electrode, said first current having a first level;
   causing said electrode to separate from said nozzle due to a pressure generated by a gas flow through the plasma cutting torch;
   detecting a separation of said electrode from said nozzle in response to a detected voltage increase on said electrode via a voltage feedback and detection circuit;
   providing a second current to said electrode after said electrode separates from said nozzle, where said second current has a second level which is lower than said first level, and maintaining said second level for a duration t;

providing at least one current pulse after said duration t, where said at least one current pulse has a peak pulse duration and a peak current level which is higher than said first level;

detecting the presence of a work current through a workpiece via a current feedback and detection circuit; and providing a plasma cutting current level to cut the workpiece after said detection of said presence of said work current.

2. The method of claim 1, wherein said plasma cutting torch is air cooled.

3. The method of claim 1, wherein said gas flow is caused by at least one of a cooling air, a shielding gas, or a cutting gas.

4. The method of claim 1, wherein said first current is a fixed current in the range of 20 to 30 amps.

5. The method of claim 1, wherein said first current is maintained for a duration of 100 to 500 ms.

6. The method of claim 1, wherein said second current is a fixed current in the range of 10 to 20 amps.

7. The method of claim 1, wherein said duration t is in the range of 5 to 40 ms.

8. The method of claim 1, wherein said peak current level is in the range of 30 to 55 amps and is maintained for a duration in the range of 3.5 to 6 seconds.

9. The method of claim 1, further comprising providing at least one additional current pulse after said at least one current pulse if said work current is not detected after said at least one current pulse.

10. A plasma cutting system, comprising:
a plasma cutting device having a controller which controls a current output of said plasma cutting device during a plasma arc starting routine, said plasma cutting device couplable to a plasma cutting torch assembly via a mating connector on said plasma cutting device;
a voltage feedback and detection circuit; and
a current feedback and detection circuit;
wherein during said plasma arc starting routine said plasma cutting device outputs a first fixed current level,
wherein when said controller detects a separation of an electrode within said plasma cutting torch assembly from a nozzle within said plasma cutting torch assembly, in response to detecting a voltage increase on said electrode via the voltage feedback and detection circuit, said plasma cutting device reduces said first fixed current level to a second fixed current level which is lower than said first fixed current level,
wherein after said second fixed current level, said plasma cutting device outputs at least one current pulse having a peak pulse duration and a pulse peak current level higher than said first fixed current level, and where said pulse peak current level is maintained for the peak pulse duration, and
wherein when said controller detects a work current in a work piece to be cut, via the current feedback and detection circuit, said plasma cutting device outputs a plasma cutting current, and when said controller does not detect said work current, said plasma cutting device initiates a second current pulse after said first current pulse.

11. The plasma cutting system of claim 10, wherein said first fixed current level is in the range of 20 to 30 amps.

12. The plasma cutting system of claim 10, wherein said first fixed current level is maintained for a duration of 100 to 500 ms.

13. The plasma cutting system of claim 10, wherein said second fixed current level is in the range of 10 to 20 amps.

14. The plasma cutting system of claim 10, wherein said second fixed current level is maintained for a duration of 5 to 40 ms.

15. The plasma cutting system of claim 10, wherein said second fixed current level is maintained for a duration of 10 to 25 ms.

16. The plasma cutting system of claim 10, wherein said pulse peak current level is in the range of 30 to 55 amps.

17. The plasma cutting system of claim 10, wherein said pulse peak current level is maintained for a duration in the range of 3.5 to 6 seconds.

18. A plasma cutting system, comprising:
a plasma cutting device having a controller which controls a current output of said plasma cutting device during a plasma arc starting routine, said plasma cutting device couplable to a plasma cutting torch assembly via a mating connector on said plasma cutting device;
a voltage feedback and detection circuit; and
a current feedback and detection circuit;
wherein during said plasma arc starting routine said plasma cutting device outputs a first fixed current level in the range of 23 to 28 amps,
wherein when said controller detects a separation of an electrode within said plasma cutting torch assembly from a nozzle within said plasma cutting torch assembly, in response to detecting a voltage increase on said electrode via the voltage feedback and detection circuit, said plasma cutting device reduces said first fixed current level to a second fixed current level which is in the range of 13 to 17 amps, and which is maintained for a duration in the range of 10 to 25 ms,
wherein after said second fixed current level said plasma cutting device outputs at least one current pulse having a peak pulse duration and a peak current level in the range of 30 to 55 amps, and where said peak current level is maintained for a peak duration in the range of 3.5 to 6 seconds, and
wherein when said controller detects a work current in a work piece to be cut, via the current feedback and detection circuit, said plasma cutting device outputs a plasma cutting current, and when said controller does not detect said work current, said plasma cutting device initiates a second current pulse after said first current pulse.

19. A plasma cutting system, comprising:
a plasma cutting device having a controller which controls a current output of said plasma cutting device during a plasma arc starting routine, said plasma cutting device couplable to a plasma cutting torch assembly via a mating connector on said plasma cutting device;
a voltage feedback and detection circuit; and
a current feedback and detection circuit;
wherein during said plasma arc starting routine said plasma cutting device outputs a first fixed current level in the range of 20 to 30 amps,
wherein when said controller detects a separation of an electrode within said plasma cutting torch assembly from a nozzle within said plasma cutting torch assembly, in response to detecting a voltage increase on said electrode via the voltage feedback and detection circuit, said plasma cutting device reduces said first fixed current level to a second fixed current level which is in the range of 10 to 20 amps, and which is maintained for a duration in the range of 5 to 40 ms, wherein after said second fixed current level said plasma cutting device outputs a plurality of current pulses having a peak pulse duration and a peak current level in the range of 30 to 55 amps and a frequency in the range of 0.25 to 30 Hz, and wherein said controller stops said pulses when a work current is detected in a work piece to be cut via the current feedback and detection circuit.

* * * * *